US008494549B1

(12) United States Patent
Pillai et al.

(10) Patent No.: US 8,494,549 B1
(45) Date of Patent: Jul. 23, 2013

(54) NETWORK CLIENT LOCATION OBSCURITY

(75) Inventors: Saveeta Pillai, Dumfries, VA (US); Christopher J. Mateski, Overland Park, KS (US); Elizabeth P. Grimbergen, Lenexa, KS (US); Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 854 days.

(21) Appl. No.: 12/388,017

(22) Filed: Feb. 18, 2009

(51) Int. Cl.
*H04W 24/00* (2009.01)
(52) U.S. Cl.
USPC ................. 455/456.1; 455/422.1; 455/403; 455/457
(58) Field of Classification Search
USPC ...... 455/456.1, 457, 422.1, 403, 456.2–456.6
See application file for complete search history.

(56) References Cited

U.S. PATENT DOCUMENTS

| | | | | |
|---|---|---|---|---|
| 6,950,664 | B2 * | 9/2005 | Chen et al. ................. | 455/456.5 |
| 7,412,518 | B1 * | 8/2008 | Duigou et al. ................ | 709/227 |
| 7,469,139 | B2 * | 12/2008 | van de Groenendaal ..... | 455/411 |
| 7,478,420 | B2 * | 1/2009 | Wright et al. ..................... | 726/1 |
| 7,526,293 | B2 * | 4/2009 | Kim et al. ................. | 455/456.2 |
| 7,787,863 | B2 * | 8/2010 | van de Groenendaal ..... | 455/411 |
| 7,869,815 | B2 * | 1/2011 | Ishii ............................ | 455/456.2 |
| 7,881,263 | B1 * | 2/2011 | Vargantwar et al. .......... | 370/331 |
| 2003/0022673 | A1 * | 1/2003 | Bantz et al. .................... | 455/456 |
| 2004/0203900 | A1 * | 10/2004 | Cedervall et al. .......... | 455/456.1 |
| 2004/0203921 | A1 * | 10/2004 | Bromhead et al. .......... | 455/456.1 |
| 2005/0288036 | A1 * | 12/2005 | Brewer et al. .............. | 455/456.2 |
| 2007/0077939 | A1 * | 4/2007 | Uematsu et al. ........... | 455/456.1 |
| 2010/0015991 | A1 * | 1/2010 | Evans et al. ................ | 455/456.1 |

OTHER PUBLICATIONS

"Google proposes 'crumbled cookies' in privacy pledge," Out-Law. com, http://www.theregister.co.uk/2007/10/01/google_privacy_pledge/, posted in telecoms, Oct. 1, 2007, 2 pp.
C.A. Ardagna et al., "Location Privacy Protection Through Obfuscation-based Techniques," in Proc. of the 21st Annual IFIP WG 11.3 Working Conference on Data and Applications Security, Redondo Beach, CA, USA, Jul. 8-11, 2007, 16 pp.
David M. Goldschlag et al., "Hiding Routing Information," Springer-Verlag LLNCS 1174, Workshop on Information Hiding, Cambridge, UK, May 1996, pp. 1-14.
Matt Duckham et al., "Simulation of Obfuscation and Negotiation for Location Privacy," A.G. Cohn and D.M. Mark (Eds.): COSIT 2005, LNCS 3693, Springer-Verlag, Berlin, Heidelberg 2005, pp. 31-48.

* cited by examiner

*Primary Examiner* — George Eng
*Assistant Examiner* — Sowmini Nair

(57) ABSTRACT

A service may request the location of a network client in order to deliver advertisements for goods and services that are geographically near the client. It is desirable for the network to provide an obscured, or approximate, location to protect the privacy of the client. The network queries the client for its PN list. From the PN list, the network determines the active cell sectors and active cell towers. The network determines all cell sectors associated with the active cell towers, and excludes the sectors that encompass the client. From the non-excluded sectors, a cell sector is randomly selected. A geographic location is randomly selected from within the cell sector. A region that encompasses the geographic location is determined, and an identifier associated with the region, such as a ZIP code, is sent to the service. The exact location of the client cannot be determined from the regional identifier.

19 Claims, 3 Drawing Sheets

NETWORK CLIENT LOCATION OBSCURITY

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In one aspect, a set of computer-useable instructions executes a method to provide an obscured location of a network client to a service in response to a request from the service for the client's geographic location. The location is obscured, or approximated, in order to protect the privacy of the client. A list of active cell sectors is received from the network client. Active cell sectors are those with which the network client is communicating and are included in a coverage by cell sites. A candidate cell sector is randomly selected. The candidate cell sector does not geographically encompass the location of the network client, and is included in the coverage by the cell sites. A geographic location is randomly selected within the candidate cell sector. A regional identifier for the geographic location is determined. The regional identifier specifies a region that encompasses the geographic location. The regional identifier is sent to the service, thereby providing an obscured location of the network client. The exact location of the network client cannot be determined from the regional identifier.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
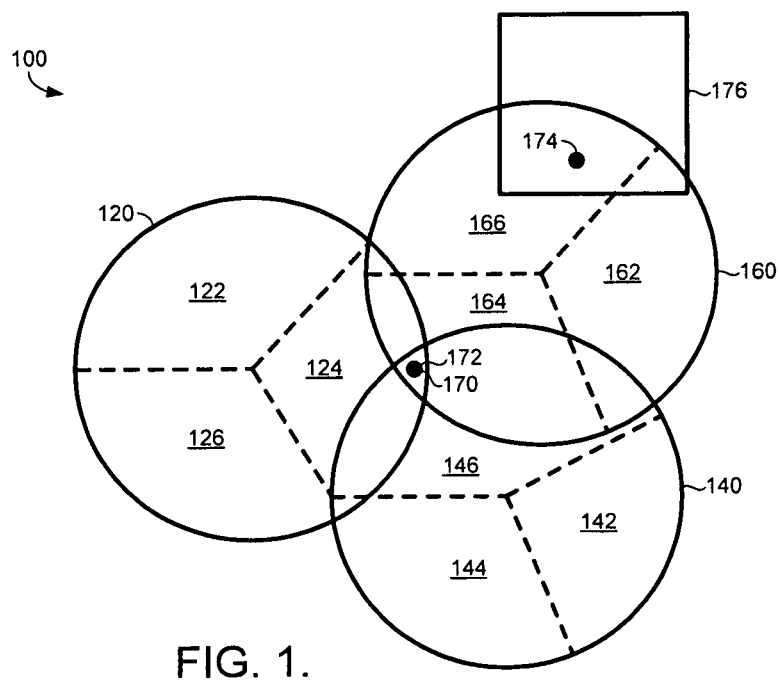
FIG. 1 depicts a block diagram of a cellular network suitable for use in accordance with an implementation of an embodiment of the present invention.

Embodiments of the present invention provide systems and methods for providing an obscured location of a network client to a service in response to a request from the service for the client's location. A service may wish to deliver advertisements to the client for goods and services that are geographically near the client's location. The service may query the network for the client's location in order to determine which sponsors' locations are near the client. In providing a client's exact location to the service, the network may violate the client's privacy. In order to protect the client's privacy, an obscured location of the client may be provided instead of the exact location. The obscured location may be an approximate location or may cover a region rather than one specific location. The service can then select advertisements within the region without knowing the exact location of the client. Some of the wording and form of description is done so herein to meet applicable statutory requirements. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:
CD-ROM Compact Disc read-only memory
DVD Digital Versatile Disc
EEPROM Electrically Erasable Programmable Read-Only Memory
PN Pseudonoise
RAM Random Access Memory
ROM Read Only Memory Further, various technical terms are used throughout this description. An illustrative resource that fleshes out various aspects of these terms can be found in *Newton's Telecom Dictionary* by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to FIG. 1, a block diagram depicts an exemplary cellular network for providing location obscurity for a network client, such as a mobile phone, and is generally referred to as a cellular network 100. Cellular network 100 is but one example of a suitable cellular network and is not intended to suggest any limitation as to scope of use or functionality. Neither should cellular network 100 be interpreted as having any dependency or requirement relating to any one or combination of components or modules illustrated.

With continued reference to FIG. 1, cells within cellular network 100 are shown as a cell 120, a cell 140, and a cell 160. A cell is an area of radio coverage associated with a cell site or cell tower. A cell consists of a number of cell sectors, typically three, each with its own communication channels, with which a network client may communicate. Within cell 120, cell sectors 122, 124, and 126 are located adjacent to each other. Within cell 140, cell sectors 142, 144, and 146 are located adjacent to each other. Within cell 160, cell sectors 162, 164, and 166 are located adjacent to each other. A network client 170 is located where portions of cell sectors 124, 164, and 146 overlap, at network client location 172.

Although network client 170 is located in an area of three overlapping sectors, network client 170 may be located within any cell sector, and may reside in one or multiple, overlapping cell sectors. A geographic location 174 lies in cell sector 166. A geographical area, a region 176, surrounds or encompasses geographic location 174.

Figure 2:
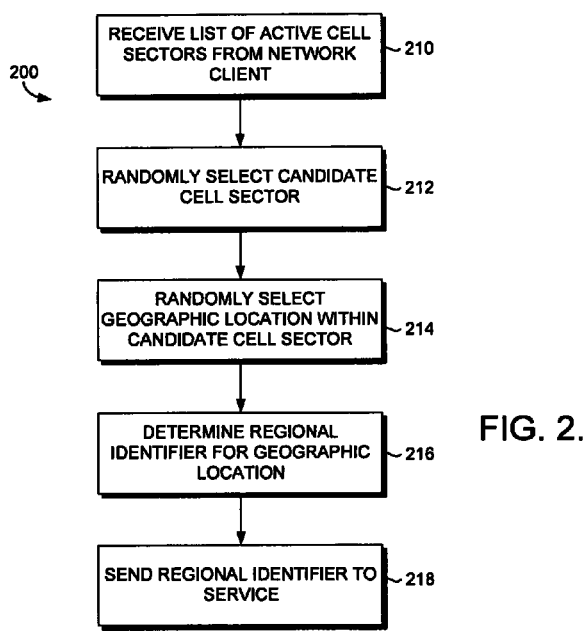
FIG. 2 depicts a method suitable for use in accordance with an implementation of an embodiment of the present invention.

Referring now to FIG. 2, a flowchart depicts an exemplary method for providing location information about a network client to a service, and is generally referred to as a method 200. Method 200 is but one example of a suitable method and is not intended to suggest any limitation as to scope of use or functionality. Neither should method 200 be interpreted as having any dependency or requirement relating to any one or combination of components or modules illustrated.

A service may query the network for the location of network client 170. The service typically includes a third party such as an advertiser or an ad server that wishes to send geographically relevant advertisements to network client 170. A geographically relevant advertisement is an ad that pertains to businesses, goods, etc. that are physically located near the network client.

It is desirable for the network to protect the client's privacy by providing an approximate, or obscure, location of the client instead of an exact location. The network requests a PN (pseudonoise) list from the network client. A PN list identifies the active cell sectors with which the network client is communicating, and also identifies the active cell towers or cell sites associated with the active cell sectors. With continued reference to FIG. 2, at a step 210, the list of active cell sectors is received from network client 170. For example, with reference to FIG. 1, there are three active cell sectors—cell sectors 124, 146, and 164. This means that network client 170 is actively communicating with cell sectors 124, 146, and 164. However, as the network client moves, different cell sectors will become active cell sectors. Cell sectors 124, 146, and 164 lie within the coverage area of the cell sites associated with cells 120, 140, and 160, respectively.

At a step 212, a candidate cell sector 166 is randomly selected from among the cell sectors that are included in the coverage of cell sites 120, 140, and 160. The candidate cell sector is selected so that it does not geographically encompass the exact location of network client 170. The process of selecting the candidate cell sector will begins with a determination of the cell sites associated with the active cell sectors 120, 140, and 160, based on the PN list received from network client 170. Based on the cell sites, a group of cell sectors, both active and non-active, included in the cells associated with the cell sites, are determined. These cell sectors are 122, 124, 126, 142, 144, 146, 162, 164, and 166. Among the sectors in the group, cell sectors that do not geographically encompass the exact location of network client 170 are designated as candidate cell sectors. Thus, the candidate cell sectors are cell sectors 122, 126, 142, 144, 162, and 166. One of the candidate cell sectors is selected at random, for example, candidate cell sector 166.

At a step 214, geographic location 174 is randomly selected from among geographic locations within the randomly selected candidate cell sector 166. A region 176 encompasses geographic location 174 along with other geographic locations. Region 176 is a region that can be specified or identified to a third party. At a step 216, a regional identifier is determined that identifies region 176. Region 176 may be a ZIP code region, in which case the regional identifier is the corresponding ZIP code.

At a step 218 the regional identifier is sent to the service that requested location 172 of network client 170. The regional identifier is provided in place of location 172. Thus, an obscured location of network client 170 is provided, because the exact geographic location 172 of network client 170 cannot be determined from the regional identifier. Further, any or all data associated with the process of providing the obscured location of network client 170 may be deleted, to eliminate the possibility that network client location 172 might be discovered.

Figure 3:
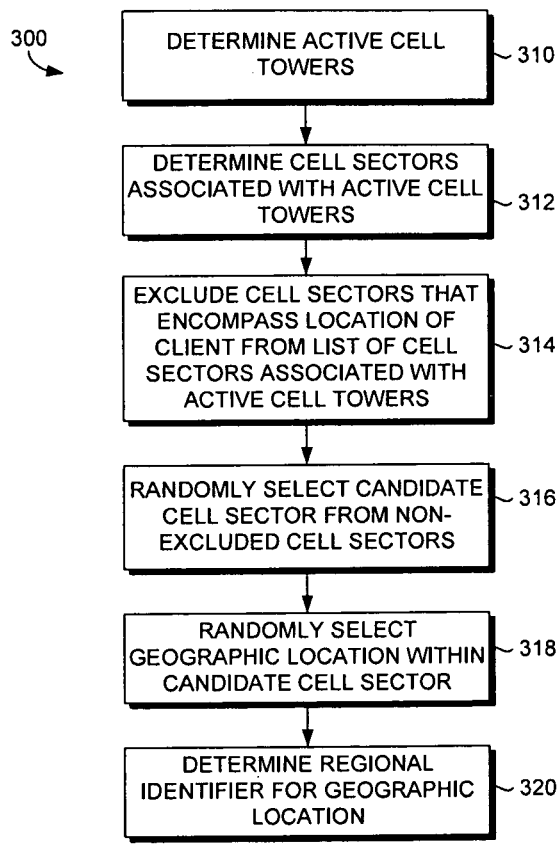
FIG. 3 depicts a method suitable for use in accordance with an implementation of an embodiment of the present invention.

Referring now to FIG. 3, a flowchart depicts an exemplary method for selecting a region physically located near a network client of a cellular network, and is generally referred to as a method 300. Method 300 is but one example of a suitable method and is not intended to suggest any limitation as to scope of use or functionality. Neither should method 300 be interpreted as having any dependency or requirement relating to any one or combination of components or modules illustrated.

The network, as discussed above in FIGS. 1 and 2, receives a request for the location 172 of the network client 170 from a service that may communicate information to the network client 170 about goods and services near the client's location. In order to protect the network client's privacy, the network may provide, to the service, an identification of a region that is physically near the network client, but does not identify the exact location 172 of the network client 170. The network requests, and receives, a list of active cell sectors (124, 146, and 164) from the network client 170.

With continued reference to FIG. 3, at a step 310, the active cell towers (120, 140, and 160) are determined based on the list of active cell sectors (124, 146, and 164). Each active cell tower has multiple cell sectors associated with it. At a step 312, the cell sectors associated with the active cell towers are determined. For example, cell sectors 122, 124, and 126 are associated with cell tower 120 as shown in FIG. 1. Cell sectors 142, 144, and 146 are associated with cell tower 140, and cell sectors 162, 164, and 166 are associated with cell tower 160, as shown in FIG. 1. At a step 314, cell sectors that geographically encompass the exact location of the network client are excluded from the list of cell sectors associated with the active cell towers. From the remaining non-excluded cell sectors, designated as candidate cell sectors, a candidate cell sector is randomly selected at a step 316. At a step 318, a geographic location within the candidate cell sector is randomly selected. At a step 320, a regional identifier is determined that identifies a region that encompasses the geographic location. An exemplary regional identifier is a ZIP code, in which case the region is a postal mail delivery area associated with the ZIP code. The regional identifier may also be any type of identifier that permits the region to be identified by a recipient of the regional identifier. For example, the regional identifier may be a set of latitude and longitude coordinates that specify a region. Because the selection of the region is based on a randomly selected location within a randomly selected candidate cell sector that does not encompass the location of the client, the exact location of the network client cannot be determined from the regional identifier. The regional identifier is communicated to the service that requested the location of the network client. Data associated with the exact location of the network is deleted to further protect the network client's privacy.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage media having computer-useable instructions operating on a computing device for performing a method of providing location information about a network client to a service, wherein an exact location of the network client is obscured, the method comprising:
   receiving a list of active cell sectors from the network client wherein an active cell sector is one with which the network client is communicating and wherein the active cell sectors are included in a coverage by one or more cell sites;
   randomly selecting a candidate cell sector wherein the candidate cell sector does not geographically encompass the exact location of the network client and wherein the candidate cell sector is included in the coverage by the one or more cell sites;
   randomly selecting a geographic location within the candidate cell sector;
   determining a regional identifier for the geographic location wherein the regional identifier specifies a region that encompasses the geographic location; and
   sending the regional identifier to the service, thereby providing an obscured location of the network client, such that the exact location of the network client cannot be determined from the regional identifier.

2. The media of claim 1, wherein randomly selecting a candidate cell sector comprises:
   determining the one or more cell sites, based on the list of active cell sectors;
   determining a group comprising the active cell sectors and non-active cell sectors included in the one or more cell sites;
   designating one or more cell sectors from the group as candidate cell sectors, wherein a candidate cell sector does not geographically encompass the exact location of the network client; and
   randomly selecting one of the candidate cell sectors.

3. The media of claim 2, wherein the location information is provided in response to a query from the service.

4. The media of claim 3, wherein the regional identifier is a ZIP code.

5. The media of claim 4, further comprising deleting data associated with the location information.

6. One or more non-transitory computer-readable storage media having computer-useable instructions operating on a computing device for performing a method of selecting a region physically located near a network client of a cellular network, wherein the region does not identify an exact location of the network client, the method comprising:
   determining one or more active cell towers with which the network client is communicating;
   determining a plurality of cell sectors associated with the one or more active cell towers;
   excluding, from the plurality of cell sectors, cell sectors that geographically encompass the exact location of the network client, thereby providing one or more non-excluded cell sectors that do not geographically encompass the exact location of the network client;
   randomly selecting a candidate cell sector from the one or more non-excluded cell sectors that do not geographically encompass the exact location of the network client, thereby providing the candidate cell sector that does not geographically encompass the exact location of the network client;
   randomly selecting a geographic location within the candidate cell sector that does not geographically encompass the exact location of the network client; and
   determining a regional identifier for the geographic location, wherein the regional identifier identifies the region, and wherein the region encompasses the geographic location, such that the exact location of the network client cannot be determined from the regional identifier.

7. The media of claim 6, wherein determining the one or more active cell towers comprises requesting, from the network client, a list of one or more active cell sectors with which the network client is communicating.

8. The media of claim 7, wherein determining the one or more active cell towers comprises receiving, from the network client, the list of the one or more active cell sectors, wherein an active cell sector is associated with an active cell tower.

9. The media of claim 8, wherein the regional identifier is a ZIP code.

10. The media of claim 9 further comprising deleting data associated with the exact location of the network client.

11. The media of claim 10, further comprising receiving a request for a location of the network client from a service.

12. The media of claim 11, further comprising communicating the regional identifier to the service.

13. One or more non-transitory computer-readable storage media having computer-useable instructions operating on a computing device for performing a method of providing an approximate location of a client in a cellular network, the method comprising:
   receiving a list of active cell sectors from the client wherein an active cell sector is one with which the client is communicating and wherein the active cell sectors are included in a coverage by one or more cell sites;
   determining one or more active cell towers with which the client is communicating;
   selecting one or more candidate cell sectors, wherein the one or more candidate cell sectors are selected from a group of cell sectors associated with the one or more active cell towers;
   randomly selecting a candidate cell sector from the one or more candidate cell sectors, wherein the candidate cell sector does not geographically encompass an exact location of the network client and wherein the candidate cell sector is included in the coverage by the one or more cell sites;
   randomly selecting a geographic location within the candidate cell sector;
   determining a regional identifier that specifies a region that encompasses the randomly-selected geographic location, wherein an exact location of the client cannot be determined from the regional identifier; and
   providing the regional identifier to a service in response to a request from the service for a location of the client, wherein the regional identifier is provided instead of the location of the client.

14. The media of claim 13, further comprising querying the client for the list of active cell sectors with which the client is communicating.

15. The media of claim 14, further comprising determining the group of cell sectors associated with the one or more active cell towers based on the list of active cell sectors.

16. The media of claim 15, wherein the one or more candidate cell sectors do not geographically encompass the exact location of the client.

17. The media of claim 16, further comprising receiving the request for the location of the client from the service and providing the regional identifier as the approximate location of the client to the service in response to the request.

18. The media of claim 17, wherein the regional identifier is a ZIP code.

19. The media of claim 18, further comprising deleting data associated with the approximate location.

\* \* \* \* \*